(12) United States Patent
Brandt et al.

(10) Patent No.: US 9,957,908 B2
(45) Date of Patent: May 1, 2018

(54) METHOD FOR ADAPTING VALVE TIMINGS OF AN INTERNAL COMBUSTION ENGINE

(71) Applicant: Robert Bosch GmbH, Stuttgart (DE)

(72) Inventors: Martin Brandt, Sachsenheim (DE); Christian Linder, Stuttgart (DE); Ulrich Bauer, Moeglingen (DE); Markus Deissler, Neckarsulm (DE); Martin Stephani, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 179 days.

(21) Appl. No.: 14/941,983

(22) Filed: Nov. 16, 2015

(65) Prior Publication Data

US 2016/0138485 A1 May 19, 2016

(30) Foreign Application Priority Data

Nov. 18, 2014 (DE) ........................ 10 2014 223 536

(51) Int. Cl.
| F02D 41/14 | (2006.01) |
| F02D 41/18 | (2006.01) |
| F02D 13/02 | (2006.01) |
| F02D 41/24 | (2006.01) |
| F02D 41/00 | (2006.01) |

(52) U.S. Cl.
CPC ..... *F02D 41/1497* (2013.01); *F02D 13/0234* (2013.01); *F02D 41/18* (2013.01); *F02D 41/2464* (2013.01); *F02D 2041/001* (2013.01); *F02D 2200/101* (2013.01); *Y02T 10/18* (2013.01)

(58) Field of Classification Search
CPC .. F02D 41/1497; F02D 41/18; F02D 13/0234; F02D 41/2464; F02D 2200/101; F02D 2041/001; Y02T 10/18
See application file for complete search history.

(56) References Cited

U.S. PATENT DOCUMENTS

2007/0088487 A1* 4/2007 Lahti ...................... F02D 37/02
701/104

* cited by examiner

*Primary Examiner* — Hung Q Nguyen
*Assistant Examiner* — Xiao Mo
(74) *Attorney, Agent, or Firm* — Norton Rose Fulbright US LLP; Gerard Messina

(57) ABSTRACT

A method for adapting valve timings of an internal combustion engine, includes selecting multiple instantaneous operating points of the internal combustion engine by comparison to specified operating points, ascertaining a cylinder charge of at least one cylinder of the internal combustion engine at each of the selected operating points, ascertaining a charge error for each selected operating point from the difference of each ascertained cylinder charge from an expected value of the cylinder charge for the particular operating point, comparing the ascertained charge errors to expected charge errors, and ascertaining an adaptation value of the valve timings from the result of the comparison.

15 Claims, 4 Drawing Sheets

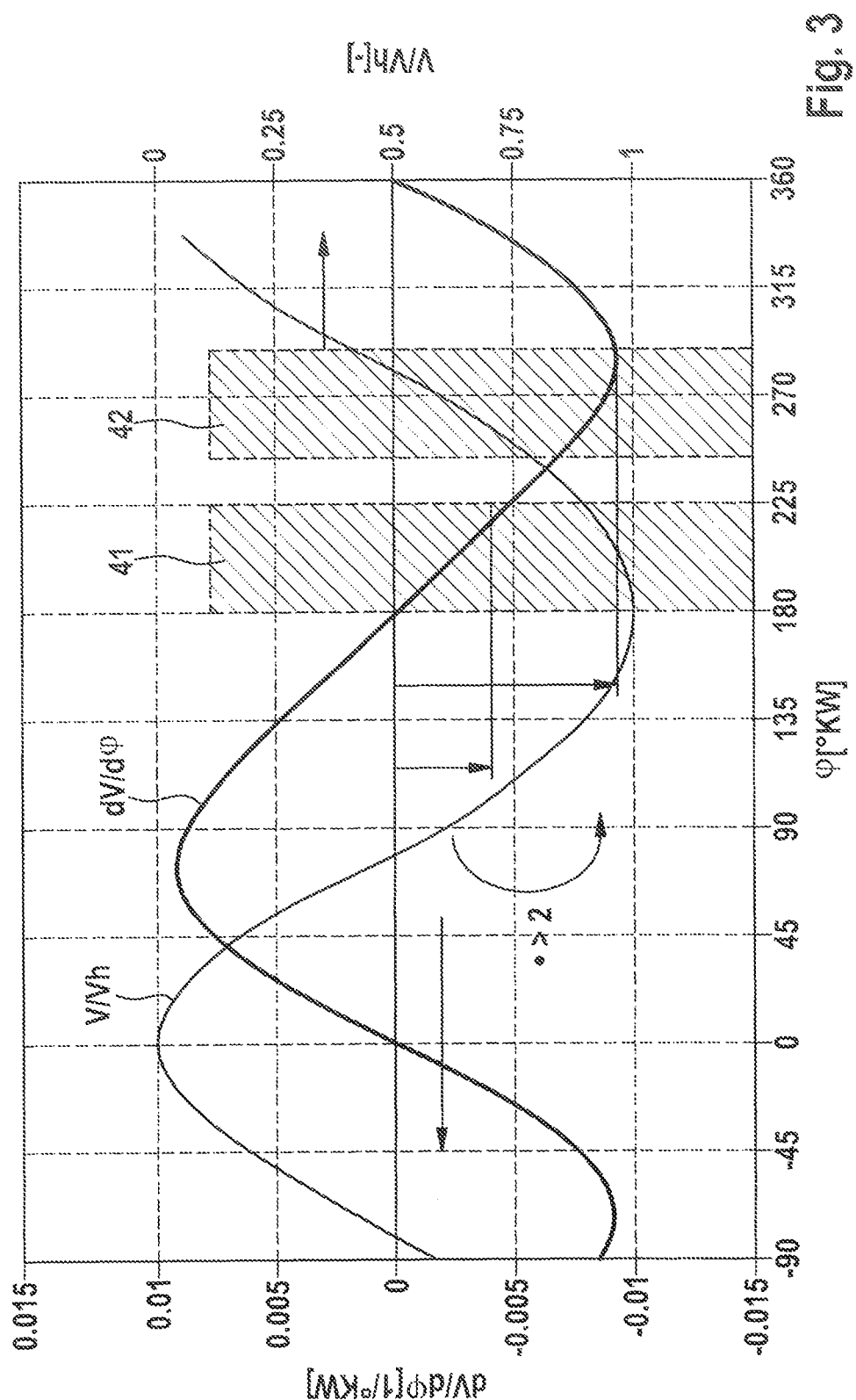

METHOD FOR ADAPTING VALVE TIMINGS OF AN INTERNAL COMBUSTION ENGINE

RELATED APPLICATION INFORMATION

The present application claims priority to and the benefit of German patent application no. 10 2014 223 536.7, which was filed in Germany on Nov. 18, 2014, the disclosure of which is incorporated herein by reference.

FIELD OF THE INVENTION

The present invention relates to a method for adapting valve timings of an internal combustion engine. Furthermore, the present invention relates to a computer program, which is configured to carry out each step of the method according to the present invention, and a machine-readable storage medium, on which the computer program according to the present invention is stored. Finally, the present invention relates to an electronic control unit, which is configured to adapt valve timings of an internal combustion engine with the aid of the method according to the present invention.

BACKGROUND INFORMATION

Present combustion methods of internal combustion engines, but in particular also combustion methods which are in development, which provide a high level of valve overlap for high internal residual gas rates and/or late or early closing of the intake valves, place increased demands on the accuracy of the valve operation. The combustion methods which are in development are used to reduce the fuel consumption of the internal combustion engine, for example, by dethrottling. Characteristic valve timings, such as, for example, intake valve closes or valve overlap, have significantly stronger influence in these combustion methods on the fresh air cylinder charge or the internal residual gas quantity than is the case in conventional combustion methods. Incorrect valve timings result, in particular in the case of a pressure-based charge detection, in a charge error, since the charge in this case is not measured via a sensor, for example, a hot-film air flow meter (HFM), but rather is calculated via a model. In addition to the intake manifold pressure, the valve timings are also entered in this model.

Errors in the valve timings result, on the one hand, due to mounting and manufacturing tolerances of the cam drive including phase shifter and encoder wheel, and also via installation and sensor tolerances of the camshaft position sensor and via the sensing of the crankshaft position. Furthermore, an influence due to chain or belt lengthening is added over the service life of the internal combustion engine.

Various approaches exist for the adaptation of the valve timings. However, the known methods share the feature that an adaptation is not carried out based on the actual charge. Thus, for example, it is assumed that the mounting and manufacturing tolerances of the camshafts are significantly less than the sensor installation tolerances. In this case, since with a new internal combustion engine, i.e., there is not yet any chain lengthening upon approach of a reference position (for example, stops of the phase shifter), an angle error may be learned as a difference between a setpoint angle and the actual angle. Depending on whether the assumptions taken with respect to individual tolerances are correct or not, an improvement of the tolerance situation may be achieved in this way.

SUMMARY OF THE INVENTION

The method according to the present invention for adapting valve timings, in particular intake valve timings, of an internal combustion engine includes the following steps:
selecting instantaneous operating points of the internal combustion engine by way of comparison to specified operating points,
ascertaining a cylinder charge, for example, via the application of a method based on the speed curve during a working cycle, of at least one cylinder of the internal combustion engine, at each of the selected operating points,
ascertaining a charge error for each selected operating point from the difference between each ascertained cylinder charge and an expected value of the cylinder charge for the particular operating point,
comparing the ascertained charge errors to expected charge errors,
ascertaining an adaptation value of the valve timings from the result of the comparison.

With the aid of the method according to the present invention, an adaptation value of the valve timings may be provided, which is based on actual timing errors. Therefore, the accuracy of the charge coverage is increased. Tolerances in the valve drive, including sensing, may thus be allocated more precisely and taken into consideration appropriately. This enables additional diagnostic functions and increased robustness during operation of the internal combustion engine, without further sensors being necessary for this purpose.

The operating points may be defined, for example, via the load or the speed of the internal combustion engine. The selection of the instantaneous operating points takes place in one specific embodiment of the method according to the present invention on the basis of specified operating points stored in a characteristics map. For this purpose, it may be established during the data supply of a control unit of the internal combustion engine which operating points are suitable for the analysis and which are not. Only the permissible operating points may then be used for the further method steps. In another specific embodiment of the method according to the present invention, the operating points may be specified by varying the valve timings at constant load of the internal combustion engine.

The ascertainment of the cylinder charge takes place in one specific embodiment of the present invention based on the speed of the internal combustion engine. For this purpose, in particular with the aid of a speed-based function, for example, the mechanical work feature (MWF), the cylinder charge is determined at the selected operating points. This also enables the ascertainment of the cylinder charge in systems without air flow meters. In another specific embodiment of the method according to the present invention, the cylinder charge may be ascertained with the aid of an air flow meter in an intake manifold of the internal combustion engine. The air flow meter is in particular a hot-film air flow meter. In this way, in systems which have an air flow meter in any case, it may be used for ascertaining the cylinder charge and subsequently calculating adaptation values for the valve timings.

The expected charge errors each correspond in particular to charge errors which are expected in the event of selected camshaft errors of the internal combustion engine.

If a pattern of the charge errors corresponds to an expected pattern or a correlation exists between the patterns, a calculation of an adaptation value for the valve timings is then possible. For example, large charge errors may be detected at operating points which have a high sensitivity of the charge with respect to camshaft errors and small charge errors may be detected at operating points having low sensitivity.

In one specific embodiment of the present invention, for the entire operating range of the internal combustion engine or for a relevant range, a characteristics map is ascertained and stored in a control unit, in which the sensitivity of the charge with respect to a timing error is contained. If a sufficient correlation results between this characteristics map and the detected charge errors, it may be presumed that the cause is induced by a timing error.

The adaptation value may be ascertained in that, via an inversion of a charge model and a statistical analysis over multiple of the selected operating points, the charge errors are converted into valve timing errors of the intake valves of the internal combustion engine. The adaptation value is ascertained from these valve timing errors. Because the ascertainment of the adaptation value is based on an actual timing error, the accuracy of the charge coverage is increased.

The computer program according to the present invention is configured to carry out each step of the method according to the present invention, in particular when it is executed on a computer or a control unit. It enables the sequence of the method according to the present invention on a conventional electronic control unit, without having to carry out structural changes thereon. For this purpose, the computer program according to the present invention is stored on the machine-readable storage medium according to the present invention. By uploading the computer program according to the present invention onto a conventional electronic control unit, the electronic control unit according to the present invention is obtained, which is configured to adapt valve timings of an internal combustion engine with the aid of the method according to the present invention.

Exemplary embodiments of the present invention are illustrated in the drawings and are explained in greater detail in the following description.

BRIEF DESCRIPTION OF THE DRAWINGS

FIG. 3 shows, in a diagram, the derivation of the cylinder volume according to the crankshaft angle and therefore the theoretical influence of a valve timing error on the cylinder charge and the ratio of the cylinder volume to the piston displacement, each as a function of the crankshaft angle in a method according to one exemplary embodiment of the present invention.

DETAILED DESCRIPTION

Figure 1:
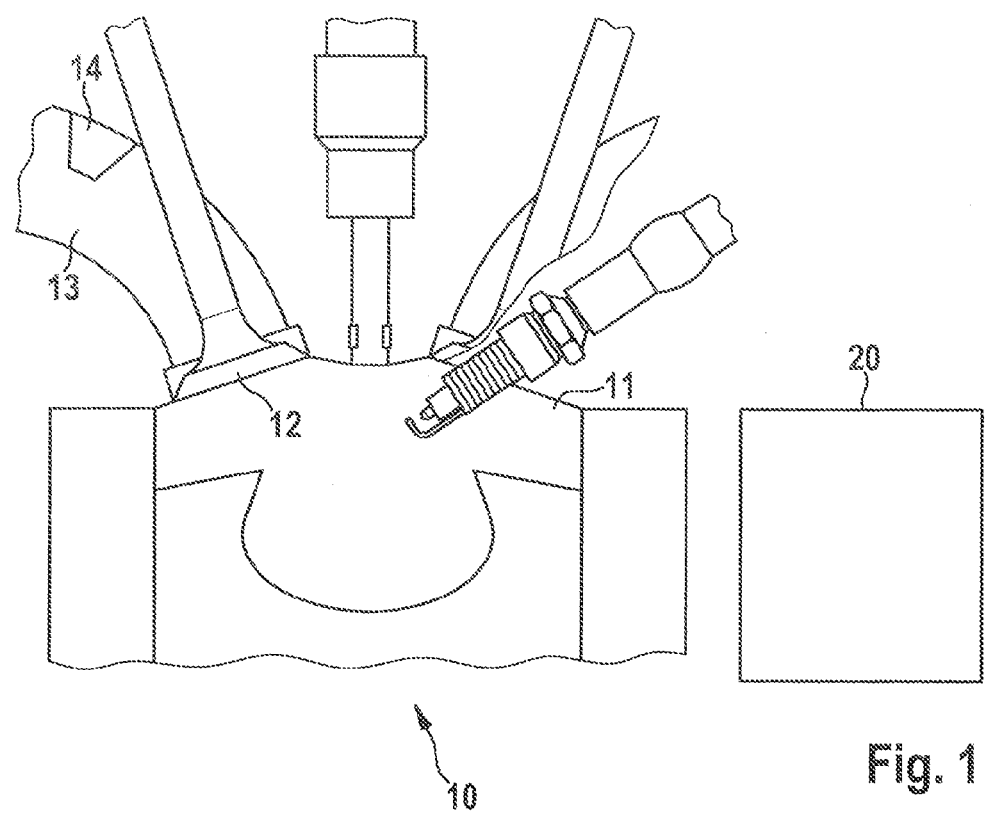
FIG. 1 schematically shows a detail of a conventional internal combustion engine, the valve timings of which may be adapted with the aid of a method according to one exemplary embodiment of the present invention.

A conventional internal combustion engine 10 has multiple cylinders 11. One of these cylinders 11 is schematically shown in FIG. 1. Air is supplied to cylinder 11 from an intake manifold 13 via an intake valve 12. The metered airflow may be determined with the aid of an air flow meter 14 in intake manifold 13 which is configured in the present case as a hot-film air flow meter (HFM). Cylinders 11 are controlled via a crankshaft (not shown) and an electronic control unit 20.

Figure 2:
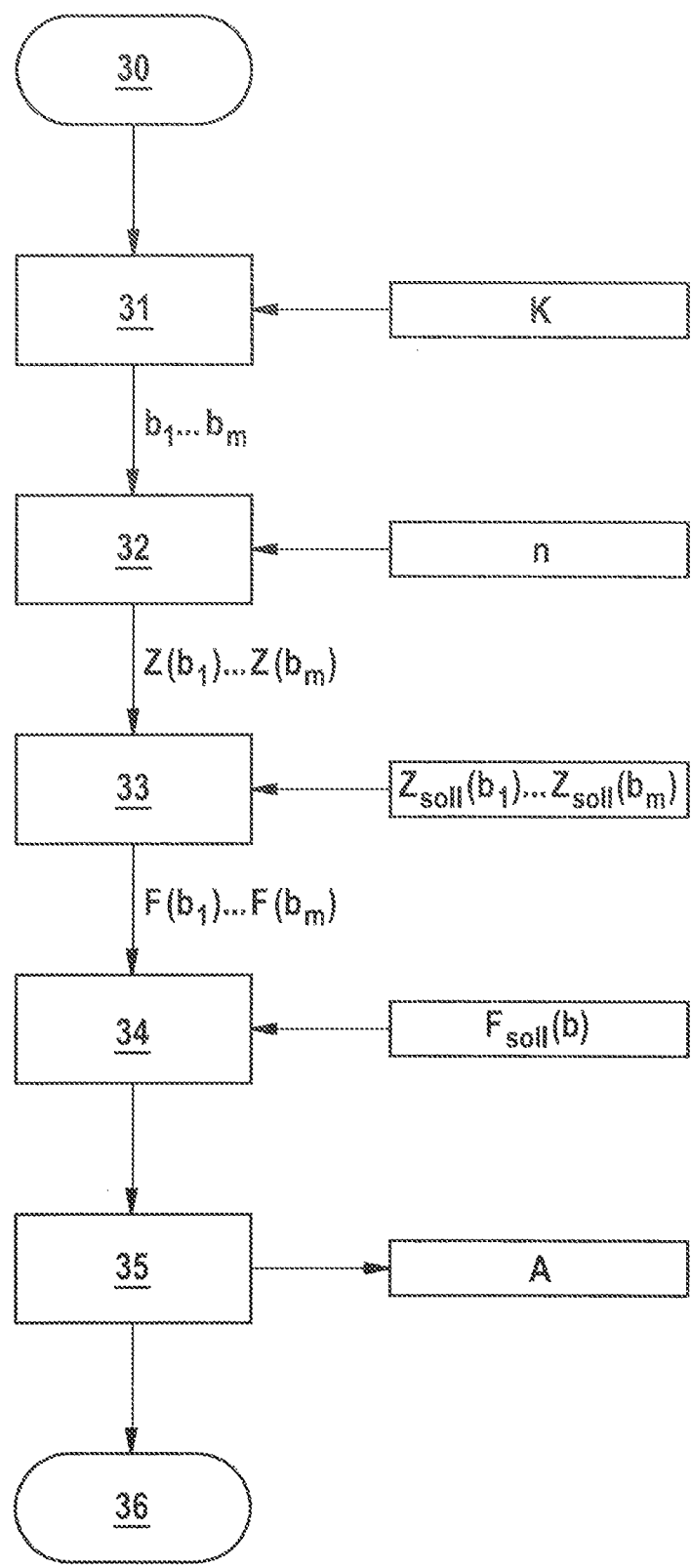
FIG. 2 shows a flow chart of a method according to one exemplary embodiment of the present invention.

The adaptation of valve timings of intake valves 12 of internal combustion engine 10 in a first exemplary embodiment of the method according to the present invention is shown in FIG. 2. After start 30 of the method, a selection 31 takes place of instantaneous operating point b of internal combustion engine 10 which corresponds to operating points which are stored in a characteristics map K of specified operating points. This characteristics map K of the specified operating points was already established during the application of electronic control unit 20. The particular instantaneous operating point is selected by the driver of a motor vehicle, which is driven by internal combustion engine 10. The method according to the present invention has no influence on this selection. For operating points b of internal combustion engine 10 which are contained in list K, namely operating points $b_1 \ldots b_m$, ascertainment 32 of a cylinder charge Z(b) of at least one cylinder 11 of internal combustion engine 10 takes place. For this purpose, mechanical work function MWF is used as a speed-based function, which may be calculated according to formula 1:

$$MWF = 0.5 \cdot \left( \Theta \cdot \left(\frac{d\varphi}{dt}\right)^2 \bigg|_{98°KWnZOT} - \Theta \cdot \left(\frac{d\varphi}{dt}\right)^2 \bigg|_{OT} \right) \quad \text{(formula 1)}$$

$$KWnZOT = CS\ CTDC$$

In the formula, $\Theta$ stands for the moment of inertia of internal combustion engine 10 which may be calculated from its geometry. $d\varphi/dt$ corresponds to the angular velocity of the crankshaft, which is calculated from the numeric and segment parts. Rotational angle $\varphi$ and/or angular velocity $d\varphi/dt$ may be calculated from speed n of the crankshaft. Speed n is measured for this purpose with the aid of a speed sensor. Alternatively, it is also possible to measure angular velocity $d\varphi/dt$ using a rotational angle sensor. Product $\Theta \cdot (d\varphi/dt)^2$ stands for a rotational energy or a kinetic energy of a rotation of the crankshaft. This rotational energy $\Theta \cdot (d\varphi/dt)^2$ as a speed-based feature is ascertained for a point in time before the combustion and after the combustion. It is provided for this purpose in the present case that the point in time before the combustion is reached when the crankshaft of the internal combustion engine reaches top dead center (TDC). The point in time after the combustion results in the present case when the crankshaft has a position of, for example, 96° in relation to the central top dead center (96° CS CTDC). Independently of the point in time before and after the combustion at which product $\Theta \cdot (d\varphi/dt)^2$ is calculated as a speed-based feature, mechanical work function MWF may be ascertained via this feature.

Ascertainment 33 of a charge error F(b) for each selected operating point b takes place according to formula 2:

$$F(b) = Z(b) - Z_{setpoint}(b) \quad \text{(formula 2)}$$

In this case, the difference between each ascertained cylinder charge Z(b) and an expected value of cylinder charge $Z_{setpoint}(b)$ is ascertained for particular operating point b.

Valve timing errors, in particular intake valve closing point in time IVC (intake valve close) have a stronger influence on cylinder charge Z(b) as the distance becomes greater from bottom dead center (BDC) in the case of Miller or Atkinson timings. As shown in FIG. 3 for Atkinson timings 42 in comparison to conventional timings 41, a change of the cylinder volume takes place with the crankshaft angle (curve V/Vh); derivative $dV/d\varphi$ identifies the change of the cylinder volume in the event of change of the crankshaft angle and therefore reflects the sensitivity of the cylinder charge with respect to a timing error. Therefore, with greater distance of IVC from BDC, a rising absolute charge error F(b) initially results. This error is also amplified in that with greater distance of IVC from BDC, the charge of cylinder 11 is also reduced, so that a smaller reference variable results and therefore relative charge error $F_{rel}$ rises more strongly.

Figure 4A:
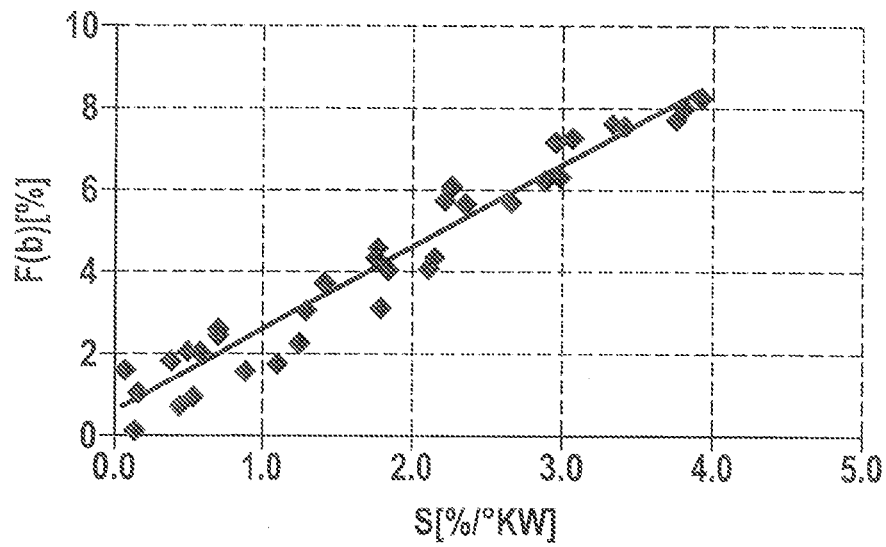
FIG. 4a shows a strong correlation of the charge error with the sensitivity of the charge in one exemplary embodiment of the present invention.
Figure 4B:
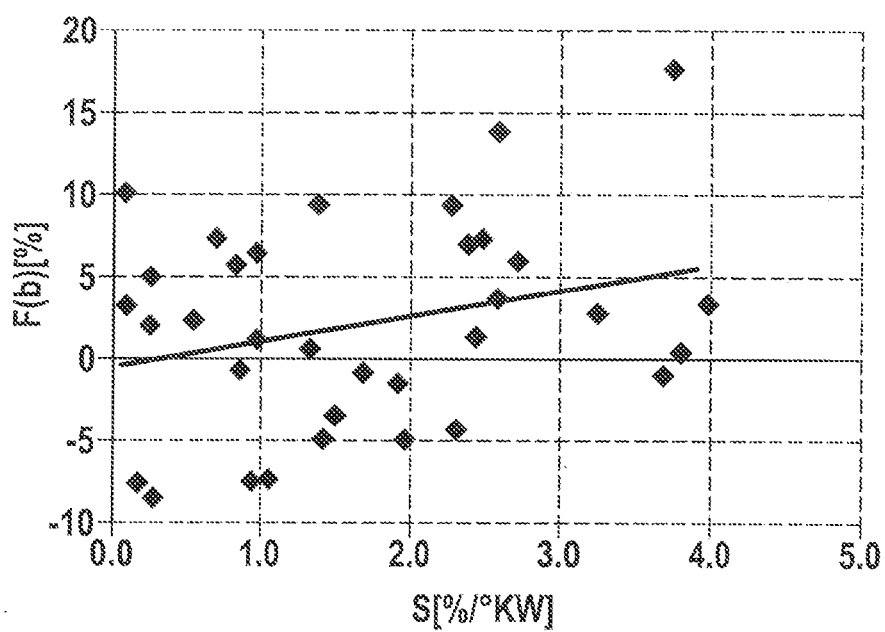
FIG. 4b shows a weak or nonexistent correlation of the charge error with the sensitivity of the charge in one exemplary embodiment of the present invention.

If a behavior of charge errors F(b) is observed over multiple operating points b, which corresponds to expected behavior $F_{setpoint}(b)$, it is thus presumed that the cause of charge errors F(b) originates from a valve timing error. An ascertainment 35 of an adaptation value A of the valve timings thereupon takes place in that, for example, the charge model of internal combustion engine 10 is inverted and a statistical analysis is carried out over multiple operating points b or, for example, by calculating a best fit straight line through the correlation values, to ascertain a valve timing error. This may be used as adaptation value A, with the aid of which an adaptation of the valve timings of intake valves 12 is carried out in further operation of internal combustion engine 10. FIGS. 4a and 4b show examples of correlations of different strengths between charge errors F(b) resulting at the selected operating points and sensitivities S of the charge with respect to the timings. The sensitivity is defined as charge error F(b) per 1° of crankshaft timing error. In the case of a strong correlation, the adaptation value may be ascertained in crankshaft degrees by calculating the slope of the best fit straight line.

In a second exemplary embodiment of the method according to the present invention, operating points b are not selected on the basis of characteristics map K. Instead, suitable operating points b are ascertained in that the valve timings of intake valves 12 at constant load of internal combustion engine 10 and the behavior of the ascertained charge error are analyzed. For example, a start takes place using typical Miller timings and variation toward valve timings intake close at bottom dead center. To keep the load constant, the intake manifold pressure has to be adapted accordingly. If charge errors are large in the case of early valve timings and small in the case of timings at bottom dead center, it is presumed that a timing error exists.

In a third exemplary embodiment of the method according to the present invention, cylinder charge Z(b) is not ascertained on the basis of speed n. Instead, it is ascertained with the aid of air flow meter 14.

What is claimed is:

1. A method for adapting valve timings of an internal combustion engine, the method comprising:
   selecting instantaneous operating points of the internal combustion engine by comparison to specified operating points;
   ascertaining a cylinder charge of at least one cylinder of the internal combustion engine at each of the selected operating points;
   ascertaining a charge error for each selected operating point from the difference between each ascertained cylinder charge and an expected value of the cylinder charge for the particular operating point;
   comparing the ascertained charge errors to expected charge errors; and
   ascertaining an adaptation value of the valve timings from the result of the comparison, the ascertaining including determining a best fit straight line through correlation values, and calculating a slope of the best fit straight line, the adaptation value being based on the slope of the best fit straight line, wherein the correlation values represent correlations between the charge errors at the selected operating points and sensitivities of the cylinder charge per 1° crankshaft timing error.

2. The method of claim 1, wherein the selection of the operating point occurs based on operating points specified in a characteristics map.

3. The method of claim 1, wherein the operating points are specified by variation of the valve timings at constant load of the internal combustion engine.

4. The method of claim 1, wherein the ascertainment of the cylinder charge occurs based on the speed of the internal combustion engine.

5. The method of claim 1, wherein the ascertainment of the cylinder charge takes place with an air flow meter in an intake manifold of the internal combustion engine.

6. The method of claim 1, wherein the expected charge errors each correspond to charge errors which are expected in the case of selected camshaft errors of the internal combustion engine.

7. A non-transitory computer readable medium having a computer program, which is executable by a processor, comprising:
   a program code arrangement having program code for adapting valve timings of an internal combustion engine, by performing the following:
      selecting instantaneous operating points of the internal combustion engine by comparison to specified operating points;
      ascertaining a cylinder charge of at least one cylinder of the internal combustion engine at each of the selected operating points;
      ascertaining a charge error for each selected operating point from the difference between each ascertained cylinder charge and an expected value of the cylinder charge for the particular operating point;
      comparing the ascertained charge errors to expected charge errors; and
      ascertaining an adaptation value of the valve timings from the result of the comparison, the ascertaining including determining a best fit straight line through correlation values, and calculating a slope of the best fit straight line, the adaptation value being based on the slope of the best fit straight line, wherein the correlation values represent correlations between the charge errors at the selected operating points and sensitivities of the cylinder charge per 1° crankshaft timing error.

8. The non-transitory computer readable medium of claim 7, wherein the selection of the operating point occurs based on operating points specified in a characteristics map.

9. An electronic control unit for adapting valve timings of an internal combustion engine, comprising:
   an electronic control arrangement for adapting the valve timings of the internal combustion engine, by performing the following:

selecting instantaneous operating points of the internal combustion engine by comparison to specified operating points;

ascertaining a cylinder charge of at least one cylinder of the internal combustion engine at each of the selected operating points;

ascertaining a charge error for each selected operating point from the difference between each ascertained cylinder charge and an expected value of the cylinder charge for the particular operating point;

comparing the ascertained charge errors to expected charge errors; and ascertaining an adaptation value of the valve timings from the result of the comparison, the ascertaining including determining a best fit straight line through correlation values, and calculating a slope of the best fit straight line, the adaptation value being based on the slope of the best fit straight line, wherein the correlation values represent correlations between the charge errors at the selected operating points and sensitivities of the cylinder charge per 1° crankshaft timing error.

10. The method of claim 1, wherein the sensitivities of the cylinder charge per 1° crankshaft timing error are charge errors per 1° crankshaft timing error.

11. The non-transitory computer readable medium of claim 7, wherein the sensitivities of the cylinder charge per 1° crankshaft timing error are charge errors per 1° crankshaft timing error.

12. The electronic control unit of claim 9, wherein the sensitivities of the cylinder charge per 1° crankshaft timing error are charge errors per 1° crankshaft timing error.

13. The method of claim 1, further comprising:
controlling valves of the internal combustion engine using the adaptation value of the valve timings.

14. The non-transitory computer readable medium of claim 7, wherein the a program code arrangement further performs:
controlling valves of the internal combustion engine using the adaptation value of the valve timings.

15. The electronic control unit of claim 9, wherein electronic control unit controls valves of the internal combustion engine using the adaptation value of the valve timings.

* * * * *